(12) United States Patent
Fischer et al.

(10) Patent No.: US 10,992,466 B2
(45) Date of Patent: Apr. 27, 2021

(54) METHOD FOR PERMUTING DATA ELEMENTS AND PERMUTING APPARATUS

(71) Applicant: Infineon Technologies AG, Neubiberg (DE)

(72) Inventors: Wieland Fischer, Munich (DE); Bernd Meyer, Munich (DE)

(73) Assignee: INFINEON TECHNOLOGIES AG, Neubiberg (DE)

(*) Notice: Subject to any disclaimer, the term of this patent is extended or adjusted under 35 U.S.C. 154(b) by 569 days.

(21) Appl. No.: 14/623,529

(22) Filed: Feb. 17, 2015

(65) Prior Publication Data

US 2015/0236853 A1 Aug. 20, 2015

(30) Foreign Application Priority Data

Feb. 17, 2014 (DE) .................... 10 2014 101 936.9

(51) Int. Cl.
| | |
|---|---|
| *H04L 9/08* | (2006.01) |
| *G06F 7/76* | (2006.01) |
| *H04L 9/06* | (2006.01) |
| *H04L 9/00* | (2006.01) |
| *G06F 7/58* | (2006.01) |

(52) U.S. Cl.
CPC ............ *H04L 9/0869* (2013.01); *G06F 7/588* (2013.01); *G06F 7/76* (2013.01); *H04L 9/003* (2013.01); *H04L 9/0618* (2013.01)

(58) Field of Classification Search
CPC ..... H04L 9/0869; H04L 9/0618; H04L 9/003; G06F 7/76; G06F 7/588

USPC .......................................................... 380/46
See application file for complete search history.

(56) References Cited

U.S. PATENT DOCUMENTS

| | | | | |
|---|---|---|---|---|
| 2003/0120990 | A1* | 6/2003 | Elbwart | H04L 1/1812 714/748 |
| 2004/0162863 | A1* | 8/2004 | Barry | G06F 7/586 708/254 |
| 2005/0021474 | A1* | 1/2005 | Geist | G06Q 20/341 705/63 |
| 2005/0213769 | A1* | 9/2005 | Girault | H04L 9/302 380/282 |
| 2008/0259939 | A1* | 10/2008 | Olpp | H04L 12/437 370/400 |
| 2010/0054471 | A1* | 3/2010 | Rawson, Sr. | H04L 9/0656 380/268 |

(Continued)

OTHER PUBLICATIONS

S. Arora and B. Barak: "Computational Complexity: A modern approach"/Cambridge University Press, 2009.

(Continued)

*Primary Examiner* — Teshome Hailu
(74) *Attorney, Agent, or Firm* — Viering, Jentschura & Partner MBB (57) ABSTRACT

One embodiment describes a method for permuting data elements, comprising receiving a sequence of data elements, and carrying out a plurality of interchange operations each comprising randomly selecting a data element from the data elements in the sequence, interchanging the data element with another data element at a deterministically predefined position in the sequence of data elements, and applying a predefined permutation to the deterministically predefined position or to the sequence of data elements.

17 Claims, 3 Drawing Sheets

(56) References Cited

U.S. PATENT DOCUMENTS

2010/0142005 A1\* 6/2010 Roskind ............. G06F 21/6254
                                                        358/3.28
2010/0246814 A1\* 9/2010 Olson ..................... G06F 21/72
                                                         380/29
2013/0061057 A1\* 3/2013 Sinha ................. H04L 63/0428
                                                        713/184

OTHER PUBLICATIONS

C. Dwork and P. Harsha: CS369E:Expanders in computer science./ Lecture Notes, 2005.
N. Linial and A. Widgerson: "Expander graphs and their applications"/ Lecture notes, The Hebrew University, Jan. 1, 2003.
Wang et al.: "New cache designs for thwarting software cache-based side channel attacks", ISCA '07 Proceedings of the 34th annual international symposium on Computer architecture, 2007, pp. 494-505, ACM New York.
Kong et al.: "Hardware-software integrated approaches to defend against software cache-based side channel attacks", High Performance Computer Architecture, HPCA 2009, IEEE 15th International Symposium, 2009, pp. 393-404, IEEE.
English Wikipedia on: Fisher-Yates shuffle, URL: http://en.wikipedia.org/w/index.php?title=Fisher%E2%80%93Yates_shuffle&oldid=592088720, accessed Jun. 26, 2014.

\* cited by examiner

METHOD FOR PERMUTING DATA ELEMENTS AND PERMUTING APPARATUS

CROSS-REFERENCE TO RELATED APPLICATION

This application claims priority to German Patent Application Serial No. 10 2014 101 936.9, which was filed Feb. 17, 2014, and is incorporated herein by reference in its entirety.

TECHNICAL FIELD

Various embodiments relate generally to methods for permuting data elements and to permuting apparatuses.

BACKGROUND

The generation of a random permutation using random bits which are generated in a uniformly distributed and independent manner is a frequently required subcomponent of cryptographic methods. Conventional applications are the copying of a memory area consisting of a plurality of cells using a secret key in a random order, evaluation of the substitution boxes of a symmetrical cipher in a random order or the permutation of a table containing secret intermediate results of a cryptographic calculation. Efficient methods for permuting data elements are accordingly desirable.

SUMMARY

Various embodiments provide a method for permuting data elements, including receiving a sequence of data elements, and carrying out a plurality of interchange operations including randomly selecting a data element from the data elements in the sequence, interchanging the data element with another data element at a deterministically predefined position in the sequence of data elements, and applying a predefined permutation to the deterministically predefined position or to the sequence of data elements.

Various embodiments provide a permuting apparatus according to the above-described method for permuting data elements.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Other embodiments are also possible and the embodiments can be changed in a structural, logical and electrical respect without deviating from the subject matter of the invention. The different embodiments do not necessarily exclude one another, but rather different embodiments can be combined with one another, thus producing new embodiments.

Data elements on a chip, for example a chip card, are permuted, for example, in order to avoid successful attacks on the chip, for example when the chip is carrying out a cryptographic method. By way of example, in order to ward off side channel attacks, it is possible to use permutations of memory areas of the chip typically containing $n \leq 64$ entries. A randomly selected permutation $\pi \in S_n$ ($S_n$: set of all permutations of n elements) then directly interchanges the logical and physical addresses during memory access operations. This makes it possible to implement, for example, countermeasures against simple power analysis, template attacks or differential power attacks on address bits.

A new permutation of the memory addresses is typically calculated before each performance of the cryptographic method. Therefore, it is ideal for this application if the required random permutation $\pi$ is generated directly by a suitable hardware component, which can be written to using few gates, or by a suitable software component which is efficient and can be programmed in a compact manner.

When generating random elements from $S_n$, where $n>2$, the basic problem exists whereby a permutation method either does not achieve a uniform distribution to $S_n$ or does not have a deterministic run time. This is typically due to the fact that the number of permutations $|S_n|$ is possibly not a power of two and therefore must be approximated. If the method for generating the permutations (that is to say the permutation method) has a finite deterministic run time, loops arise in the calculated probability distribution across the set of all permutations.

Simple algorithms for approximating random permutations, that is to say permutation methods which generate approximately random permutations, will be described below. That is to say, these methods achieve a uniform distribution of the permutations only asymptotically. For this purpose, the algorithms have a deterministic run time and it is possible to specify upper limits for the maximum deviation of the probability of the occurrence of a permutation from the uniform distribution. In addition, the maximum deviation from the uniform distribution can be easily controlled using the number of repetitions of the algorithms. The algorithms described below approximate a random permutation from $S_n$ by applying a sequence of random transpositions.

A permutation from $S_n$ is represented below as a sequence $(a_1, \ldots, a_n)$ of the numbers 1 to n. The associated permutation map is $i \rightarrow a_i$ for $1 \leq i \leq n$. It is assumed that the sequence $(a_1, \ldots, a_n)$ is initialized with the representation of any desired permutation from $S_n$.

The Fisher-Yates algorithm for generating a random permutation from $S_n$ operates as follows:

Algorithm 1:
1) For i←1 to n−1
2) randomly select $j \in \{0, \ldots, n-i\}$
3) interchange the values $a_1$ and $a_{i+j}$ in the sequence The method generates all elements from $S_n$ with the same probability but has the problem (like the variants according to Durstenfeld and Sattolo) that, with the use of uniformly distributed random bits, a number $j \in \{0, \ldots, n-i\}$ must be randomly calculated for $1 \le i \le n-1$. At least $\log(n-i+1)$ random bits are required in each iteration for this purpose. If n−i+1 is not a power of two, it may be the case that the bit string generated by the random number generator represents a number greater than n−i. In this case, the random bits generated are discarded and the process must be repeated. Depending on n, the expected value for the number of attempts needed to generate a random index may be virtually 2 as a result.

A further algorithm which describes the fundamental approximation procedure is the following algorithm:

Algorithm 2:
1) For i←1 to l
2) randomly select indices $j, k \in \{1, \ldots, n\}$
3) interchange the values $a_j$ and $a_k$ in the sequence This algorithm approximates a random permutation from $S_n$ by a sequence of random transpositions of the elements. Although the method has exponential convergence in the number l of iterations of the main loop, the specific number of iterations needed to undershoot a given maximum deviation from the uniform distribution is relatively large. In addition, the algorithm requires a large number of random bits since two random indices must be generated independently of one another in each loop pass. In this case, the issue exists, for example, of how such indices can be determined with the aid of uniformly distributed random bits if n is not a power of two.

It should be noted that algorithm 2 explicitly allows the case j=k. Without this case, the permutation generated would change between even and odd permutations each time the loop is executed and the method could not converge toward a random permutation. The associated graph would be bipartite without transitions of a state of the corresponding Markov automaton per se.

Proof that algorithm 2 converges toward a random permutation independently of the starting value for l→∞ is given below, in which case the maximum deviation of the probability of the occurrence of a particular permutation from the uniform distribution tends toward 0 exponentially in l.

In order to examine the convergence speed of the approximation methods for random permutations, the permutation methods are considered to be Markov automata.

The state set of the automata consists of the set of all permutations from $S_n$. Let A be an algorithm. Iteration of the loop of A maps the representation $(a_1, \ldots, a_n)$ of a permutation to the representation $(b_1, \ldots, b_n)$ of another permutation with a probability given by A.

With respect to a fixed order of the permutations from $S_n$, the Markov automaton which carries out an iteration of the loop of A can be described by a stochastic matrix $M=(m_{i,j}) \in [0,1]^{w \times w}$ where $1 \le i, j \le w = |S_n|$. In this case, $m_{i,j}$ is the probability of the automaton changing from permutation i to permutation j. Let $\pi = (\pi_1, \ldots, \pi_w)$ be the probability distribution at the beginning of the loop, where $\pi_i$ is the probability of the sequence $(a_1, \ldots, a_n)$ representing the permutation $\pi_i$. The probability distribution $\pi'$ after carrying out an iteration of the loop of A then results as $\pi' = M\pi$. The algorithm A therefore calculates the distribution $A(\pi) = M^l \pi$ after l loop passes.

Algorithm 2 is relatively easy to analyze because the associated matrix M is symmetrical for an iteration of the main loop and therefore has w real eigenvalues $\lambda_1, \ldots, \lambda_w$. Without loss of generality, the following will be assumed:

$$|\lambda_1| \ge |\lambda_2| \le \ldots \le |\lambda_w|.$$

However, in M, not all entries different from 0 have the same value. The value 1/n for the case j=k is on the diagonal, and the other entries different from 0 have the value $2/n^2$ if the relevant permutations can be converted into one another by using a transposition. These different entries are the reason for using a multigraph in the proof of lemma 1 below.

Since M is a symmetrical transition matrix of a Markov automaton, the sum of entries in each row is also 1. It follows from this that the vector $u=(1/w, \ldots, 1/w)$ for the uniform distribution of all permutations from $S_n$ is an eigenvector of M with an eigenvalue of 1. Since it also follows from the normalization condition of the stochastic matrix that $|\lambda_i| \le 1$ applies to all eigenvalues, $\lambda_1 = 1$ can be assumed without loss of generality.

If $\pi = (\pi_1, \ldots, \pi_w)$ is a probability distribution over $S_n$, $\pi - u$ is orthogonal to u since the following applies $$\langle \pi - u, u \rangle = \sum_{1 \le i \le w} \left(\pi_i - \frac{1}{w}\right)\frac{1}{w} = \frac{1}{w}\left(\sum_i \pi_i - \sum_i \frac{1}{w}\right) = 0.$$

For a probability distribution $\pi$ over $S_n$, there is therefore a vector $\pi^\perp$ where $\pi = u + \pi^\perp$ and $\pi^\perp \perp u$. It also follows from $\pi - u \perp u$ that $\|\cdot\| \le \|\pi\| \le 1$:

$$\|\pi - u\|^2 = \sum_{1 \le i \le w} \pi_i\left(\pi_i - \frac{1}{w}\right) - \frac{1}{w}\left(\pi_i - \frac{1}{w}\right) = \sum_i \pi_i\left(\pi_i - \frac{1}{w}\right) < \sum_i \pi_i^2 = \|\pi\|^2$$

If $\{b_i\}$ is an orthogonal basis of eigenvectors for the eigenvalues $\lambda_i$ and if $$x = \sum_i \mu_i b_i$$

is a vector, the following applies $$\|Mx\|^2 =$$

$$\left\|\sum_i \mu_i M b_i\right\|^2 = \left\|\sum_i \mu_i \lambda_i b_i\right\|^2 = \sum_i \lambda_i^2 \|\mu_i b_i\|^2 \le \max_j \lambda_j^2 \sum_i \|\mu_i b_i\|^2 = \max_j \lambda_j^2 \sum_i \|\mu_i b_i\|^2 = \max_j \lambda_j^2 \sum_i \|x\|^2.$$

Pythagoras' theorem was used repeatedly in the conversions. For $x = b_j$, the maximum is assumed.

The Rayleigh quotient now provides a relationship between the second largest eigenvalue $|\lambda_2|$ of M and the vector $\pi^\perp$:

$$|\lambda_2| = \max_{x \perp u} \frac{\|Mx\|}{\|x\|}$$

After carrying out an iteration of the loop of the algorithm, the following estimation therefore applies to the deviation of the probability distribution $\pi$ from the uniform distribution $$\|M\pi - u\|^2 = \|M(\pi - u)\|^2 = \|M\pi^\perp\|^2 \le \lambda_2^2 \|\pi^\perp\|^2 = \lambda_2^2 \|\pi - u\|^2$$

and the following estimation applies to the maximum deviation of the probability distribution, calculated by the algorithm after l loop passes, from the uniform distribution $$\|A(\pi) - u\|_\infty = \|M^l \pi - u\|_\infty$$

$$\le \|M^l \pi - u\|$$

$$\le |\lambda_2|^l \cdot |\pi - u|$$

$$< |\lambda_2|^l \cdot \|\pi\| \quad (1)$$

$$\le |\lambda_2|^l \cdot \|\pi\|_1$$

$$= |\lambda_2|^l. \quad (2)$$

In this case, the estimation $\|\pi^\perp\| < \|\pi\|$ is used again for (1). In order to conclude from (2) that the method from the algorithm converges toward a random permutation independently of the starting value for $l \to \infty$, in which case the maximum deviation of the probability of the occurrence of a particular permutation from the uniform distribution tends toward 0 exponentially in l, an upper limit c where $|\lambda_2| \le c < 1$ must also be shown.

A d-regular multigraph with loops is presupposed for the following lemma. A graph G is d-regular if each node has precisely d edges. In a multigraph, there may be any desired number of edges between two nodes. Bipartite graphs are excluded by the loops. The normalized adjacency matrix of a bipartite graph has the eigenvalue $-1$. Therefore, $|\lambda_2| = 1$, and it is no longer possible to conclude the convergence of the approximation methods using (2). The diameter $\delta$ of a graph below is the maximum distance (that is to say the length of the shortest path) between two arbitrary nodes of the graph.

Lemma 1:

If $G = (V, E)$, where $|V| = w$, is a d-regular contiguous multigraph with loops at all nodes and if $\delta$ is the diameter of G, the following applies to the second largest eigenvalue $\lambda$ of the normalized adjacency matrix of G:

$$|\lambda| < 1 - \frac{1}{4dw\delta}$$

Proof:

If $u = (1/w, \ldots, 1/w)$ and $\pi \perp u$, where $\|\pi\| = 1$, are vectors and $M = (m_{i,j})$ is the normalized adjacency matrix of G, the notations $\varepsilon = 1/(2dw\delta)$ and $v = M\pi$ are used. It follows from the definition of the second eigenvector using the Rayleigh quotient that, in order to prove the lemma, it is sufficient to show that $\|v\| < 1 - \varepsilon/2$.

The stronger estimation $1 - \|v\|^2 > \varepsilon$ is proved below, from which the assertion of the lemma follows.

This is because if it is conversely assumed that $\|v\| \ge 1 - \varepsilon/2$, $\|v\|^2 \ge 1 - \varepsilon$ or equivalently $1 - \|v\|^2 \le \varepsilon$ is obtained.

The following applies:

$$\sum_{1 \le i, j \le w} m_{i,j}(\pi_i - v_j)^2 = \sum_{i,j} m_{i,j}\pi_i^2 - 2\sum_{i,j} m_{i,j}\pi_i v_j + \sum_{i,j} m_{i,j} v_j^2$$

$$= \|\pi\|^2 - 2\langle M\pi, v \rangle + \|v\|^2$$

$$= \|\pi\|^2 - 2\|v\|^2 + \|v\|^2$$

$$= 1 - \|v\|^2$$

In this case, use was made of the fact that the row and column sums of M produce the value 1, that $\|v\|^2 = \langle M\pi, v \rangle$ and that $\pi$ is a unit vector. In order to prove the lemma, it therefore suffices to show that $$\sum_{1 \le i, j \le w} m_{i,j}(\pi_i - v_j)^2 > \varepsilon.$$

The following follows from the orthogonality of $\pi$ and u $$\sum_{1 \le i \le w} \pi_i = w \sum_i \pi_i \frac{1}{w} = w \langle \pi, u \rangle = 0.$$

Therefore, there are nodes i, j, where $\pi_i > 0$ and $\pi_j < 0$. Since $\pi$ is a unit vector, there are, in particular, nodes i, j, where $\pi_i - \pi_j > 1/\sqrt{w}$. Since G is contiguous with the diameter $\delta$, there is a shortest path $z_0, z_1, \ldots, z_t \in V$ of the length $t \le \delta$ in G, which connects $i = z_0$ and $j = z_t$. The following therefore applies:

$$\frac{1}{\sqrt{w}} < \sum_{0 \le i < t} (\pi_{z_i} - v_{z_i}) + (v_{z_i} - \pi_{z_{i+1}}) \le \quad (3)$$

$$\sum_{0 \le i < t} |\pi_{z_i} - v_{z_i}| + |v_{z_i} - \pi_{z_{i+1}}| \le$$

$$\sqrt{2\delta \sum_{0 \le i < t} (\pi_{z_i} - v_{z_i})^2 + (v_{z_i} - \pi_{z_{i+1}})^2}$$

In this case, the relationship $\|x\|_1 \le \sqrt{n}\|x\|_2$ between the total magnitude norm and the Euclidean norm is used in the step with respect to (3) of the conversions, where x is an n-dimensional vector.

Since the graph G has a loop at each node and is d-regular, a contribution of at least $1/d$ by the normalized adjacency matrix of the graph is obtained for each summand under the root in (3)

$$\sum_{1 \le i, j \le w} m_{i,j}(\pi_i - v_j)^2 > \frac{1}{2dw\delta} \quad (4)$$

and the statement of the lemma follows.

A better estimation may result if the minimal entry different from 0 in M is calculated as a contribution in (4) instead of $1/d$. The value is then doubled to $2/n^2$ for analyzing algorithm 2. There are many estimations for the second eigenvalue of the adjacency matrix of a graph under different assumptions.

For sufficiently large values n, the following therefore approximately applies $$\|A(\pi) - u\|_\infty < \left(1 - \frac{1}{4dw\delta}\right)^l \approx e^{-l/(4dw\delta)}.$$

Therefore, at least $l \approx 4n!(n^3-n^2) \ln(1/\varepsilon)$ iterations of the main loop would be necessary in algorithm 2 for $d=n^2$ and $\delta \leq n-1$ in order to achieve a maximum deviation of the calculated probability distribution over the set of permutations from $S_n$ from the uniform distribution of at most $\varepsilon$. This formula indeed shows, on the one hand, that the deviation $\varepsilon$ tends toward 0 exponentially in l independently of the starting value $\pi$. On the other hand, the coefficient factor is large, with the result that a very large number of required iterations already results for small values n.

However, in this case it must also be taken into account that the upper limit for the second largest eigenvalue of the transition matrix of the Markov automaton contains many simplifications and is therefore inaccurate.

For example, $n=4$ and $\varepsilon=1/1000$ produce the value $l \approx 31831$. If the minimum contribution of M with $n^2/2$ is taken into account in (4) instead of d, the value is halved.

The better limit $l \geq n/2 \ln(1/\varepsilon)+n/2 \ln(n)+O(n)$ can be proved for algorithm 2 using symmetrical group representation theory techniques.

According to one embodiment, the fundamental principle from algorithm 2 is extended by applying a cyclical interchange of all elements in $\{a_1, \ldots, a_n\}$ each time the main loop is carried out.

Figure 1:
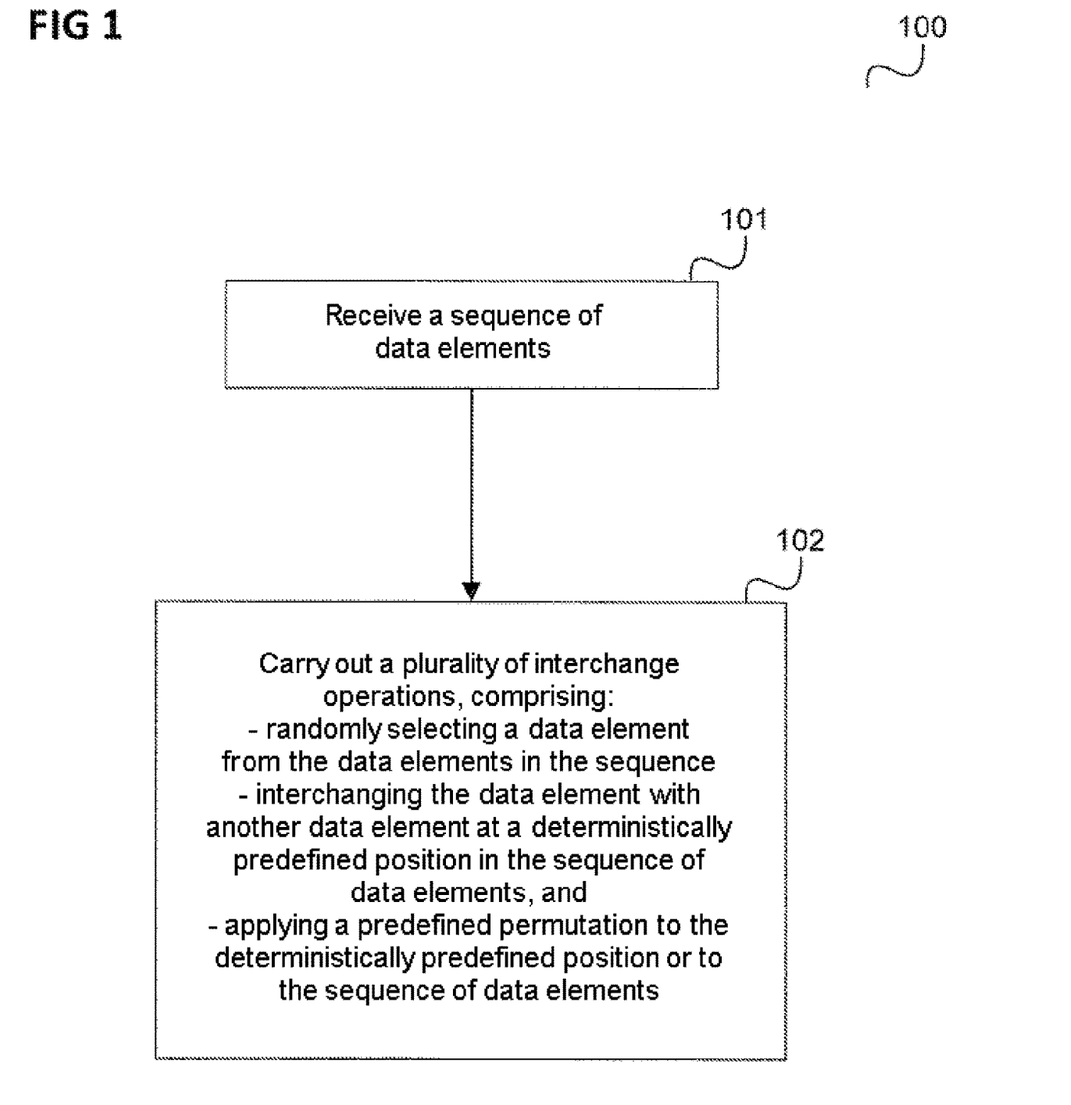
FIG. 1 shows a flowchart according to one embodiment.

A method, as illustrated in FIG. 1, is generally provided, for example.

FIG. 1 shows a flowchart 100 according to one embodiment.

A sequence of data elements is received in 101.

A plurality of interchange operations are carried out in 102.

Each interchange operation includes randomly selecting a data element from the data elements in the sequence, interchanging the data element with another data element at a deterministically predefined position in the sequence of data elements, and applying a predefined permutation to the deterministically predefined position or to the sequence of data elements.

In other words, in one embodiment, a position of a permutation vector is deterministically determined in an interchange operation, another position of the permutation vector is randomly determined, and the elements at the two positions are interchanged. At the end of the interchange operation (for example in all interchange operations, apart from the last operation of a multiplicity of interchange operations), a predefined permutation is applied to the deterministically predefined position (for example, the deterministically predefined position is cyclically moved along by one or more elements) or to the sequence of data elements (for example, the sequence is cyclically rotated), the deterministic position remaining constant, for example, in this case. This makes it possible to ensure that each position in the sequence becomes the object of an interchange operation.

For example, in one embodiment, positions of a permutation vector are deterministically run through and the current element of the permutation vector is interchanged with an element randomly selected from all elements of the permutation vector.

According to one embodiment, a plurality of interchange operations according to the described interchange operation are carried out in succession (iteratively) in 102, for example until a particular abort criterion, for example a predefined number of iterations, is reached.

The permutation method can be used, for example, to copy a memory area consisting of a plurality of cells using the secret key in a random order, to evaluate the substitution boxes of a symmetrical cipher in a random order or to permute a table containing secret intermediate results of a cryptographic calculation.

According to one embodiment, a method for generating random permutations includes:
- the iterated application of transpositions in which one index is deterministic and the other index is determined by a randomized method
- the performance of deterministic cyclical interchange steps which may be given either explicitly (for example by rotating all elements) or implicitly (for example by incrementing the deterministic index of the transpositions).

The cyclical interchange steps cause each position to become the object of a transposition at least once within a predictable number of iterations.

The predefined permutation is, for example, a cyclical permutation, for example a cyclical rotation.

The method also includes, for example, receiving a random number and randomly selecting the data element from all data elements in the sequence on the basis of the random number.

For example, the method includes receiving the random number from a random number generator.

According to one embodiment, the data element is selected by dividing the random number by the number of data elements with a remainder and selecting the data element as that data element which is indicated by the remainder according to indexing of the data elements.

According to one embodiment, the data element is selected from a subset of the data elements in the sequence.

The subset contains, for example, a number of data elements which is equal to a power of two.

For example, the number is equal to the greatest power of two which is less than or equal to the number of data elements in the sequence.

If the predefined permutation is applied to the sequence of data elements, the deterministically predefined position may be a constant position, for example.

According to one embodiment, the method includes storing the sequence of data elements in a shift register and cyclically rotating the sequence of data elements using the shift register.

A unique iteration index, for example, is assigned to each interchange operation of the plurality of interchange operations.

For example, for an interchange operation, the deterministically predefined other data element is deterministically predefined by the iteration index of the interchange operation.

For example, for an interchange operation, the deterministically predefined other data element is that data element which, according to indexing of the data elements, has an index which corresponds to the iteration index of the interchange operation.

Figure 2:
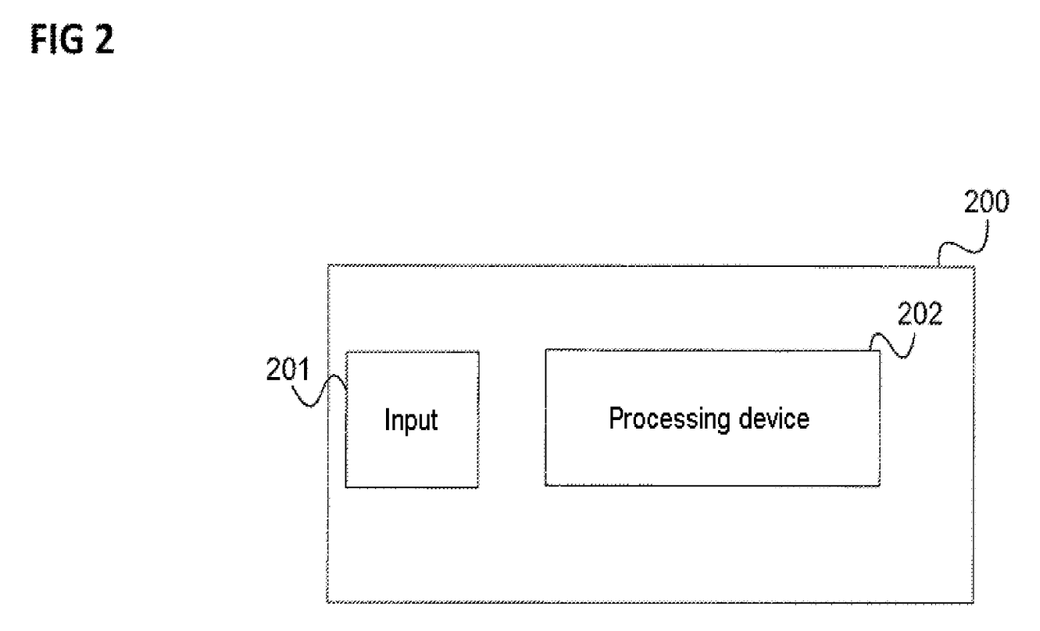
FIG. 2 shows a permuting apparatus.

The method illustrated in FIG. 1 is carried out, for example, by a permuting apparatus as illustrated in FIG. 2.

FIG. 2 shows a permuting apparatus 200.

The permuting apparatus 200 has an input 201 which is set up to receive a sequence of data elements.

The permuting apparatus 200 also has a processing device 202 which is set up to carry out a plurality of interchange operations, wherein each interchange operation includes randomly selecting a data element from the data elements in the sequence, interchanging the data element with another data element at a deterministically predefined position in the sequence of data elements, and applying a predefined permutation to the deterministically predefined position or to the sequence of data elements.

For selection and interchange, the processing device 202 has, for example, a selection device and an interchange device (for example in the form of a shift register).

The components of the permuting apparatus may be implemented by one or more circuits. In one embodiment, a "circuit" can be understood as meaning any unit which implements logic and may be hardware, software, firmware or a combination thereof. In one embodiment, a "circuit" may be a hard-wired logic circuit or a programmable logic circuit, for example a programmable processor, for example a microprocessor. A "circuit" may also be understood as meaning a processor which executes software, for example any type of computer program. In one embodiment, a "circuit" can be understood as meaning any type of implementation of the functions described below.

With the notation used above for algorithms 1 and 2, data elements are interchanged, for example, according to an embodiment in accordance with the following algorithm:

Algorithm 3:
1) For i←1 to l
2) randomly choose index j∈{1, . . . , n}
3) interchange the values $a_1$ and $a_j$ in the sequence
4) cyclically rotate the resulting sequence ($a_1$, . . . , $a_n$) by one position to the left The cyclical interchange step in 4) of algorithm 3 is not required for the basic convergence of the method. However, the algorithm with the interchange step requires a considerably smaller number l of iterations of the main loop in order to approximate a permutation with a maximum given deviation from the uniform distribution. In addition, algorithm 3 requires only a randomly selected index j∈{1, . . . , n} during each pass. As a result, the number of random bits needed to approximate a permutation is also considerably reduced (for example in comparison with algorithm 2).

When analyzing algorithm 3, the additional difficulty arises whereby the transition matrix M of the Markov automaton is no longer symmetrical for an iteration of the main loop as a result of the rotation of all elements of the state vector in step 4), as was the case with algorithm 2. Therefore, it can no longer be assumed that the matrix has w real eigenvalues, which is an important prerequisite for the analysis method used for algorithm 2.

Therefore, a variant of algorithm 3 in which the rotation in step 4) is not carried out is first of all considered below. If M' is the transition matrix of the associated Markov automaton for an iteration of the main loop, M' is symmetrical again. In contrast to algorithm 2, d=n and δ≤n/2−1 for the variant of algorithm 3 because, in the worst-case scenario, the target configuration of the path consists only of transpositions and three iterations of the main loop are required in each case in order to interchange the elements of a transposition at the correct position. It follows that the method also converges toward the uniform distribution exponentially in l for the variant of algorithm 3.

If M=P·M', where P is the permutation matrix for the rotation of all elements of the state vector in step 4), the following still applies:

$$\|M\pi-\|=\|PM'\pi-u\|=\|P(M'\pi-u)\|=\|M'\pi-u\|$$

In this case, use was made of the fact that P is a permutation matrix where Pu=u. The convergence of algorithm 3 can now be proved in a similar manner using the techniques already described. This results overall in at least l≈2n!($3n^2$−2n)ln(1/ε) iterations of the main loop being needed to achieve a maximum deviation of the calculated probability distribution over the set of permutations from $S_n$ from the uniform distribution of at most ε.

However, in the analysis of algorithm 3 carried out here, the influence of the permutation P on the convergence is not taken into account at all. The resulting values for the number l of necessary iterations of the main loop in order to guarantee a maximum deviation ε from the uniform distribution should therefore be handled carefully in a similar manner to that in the previous analysis of algorithm 2.

When describing the approximation algorithms, it was previously assumed that a random index for interchanging elements of the represented permutation can be generated using independent and uniformly distributed random bits. Such an index can typically be calculated with a uniform distribution only when the number n of elements to be permuted is a power of two. Simple variants of the approximation methods described, which are suitable for an arbitrary n, are considered below.

It follows from the above analysis of the convergence conditions of permutation methods 2 and 3 that the associated Markov automata also strive for a uniform distribution of the state set when the edges for the random walk are selected to be not uniformly distributed on the state set. In the above analysis, use was already made of the fact that the proof also remains valid when the transitional relationships of the automata can be described by a multigraph. The different values for transition probabilities in algorithm 2 have already been represented by multigraphs in this manner However, conversely, such a multigraph can be used to code any desired rational transition probabilities of a Markov automaton. If all rational transition probabilities are transformed to a common denominator, the number of edges in the graph between two states corresponds to the respective numerator of the transition probability. This results in various possibilities for generalizing the described permutation methods for any desired values n.

If u is an integer where $2^u$≥n, a variant of algorithm 3 can be implemented as follows, for example:

Algorithm 4:
1) For i←1 to l
2) generate random u-bit number r
3) calculate j←(r mod n)+1
4) interchange the values $a_1$ and $a_j$ in the sequence
5) cyclically rotate the resulting sequence ($a_1$, . . . , $a_n$) by one position to the left In 3) of algorithm 4, each mapping of the random number r∈{0, 1}$^u$ to {1, . . . , n} is suitable for ensuring the convergence of the method. The algorithm converges better if this mapping is surjective and accepts all elements from {1, . . . , n} as images in a manner which is as uniformly distributed as possible.

If u is the smallest number where $2^u$>n, the calculation j←(r mod n)+1 can be implemented in hardware by a subtraction and multiplexers which select the subtraction result if no underflow has occurred, and otherwise select r.

Even if the approximation method still converges toward the uniform distribution exponentially in l to $S_n$, the changes in comparison with algorithm 3 influence the convergence speed. The worst-case scenario occurs if n=$2^{u-1}$+1. In this case, the contribution of the adjacency matrix, which can be taken into account in (4) of the analysis for estimating the sum, is virtually halved. As a result, the number l of required iterations is doubled.

It is not clear whether similarly simple constructions for approximating permutations using Feistel ciphers or substitution permutation networks if n is not a power of two exist.

In another embodiment, the transpositions are applied only to a subset of the elements. For this purpose, let u be an integer where $1 < 2^u < n$:

Algorithm 5:
1) For i←1 to l
2) generate random u-bit number r
4) interchange the values $a_1$ and $a_r$ in the sequence
5) cyclically rotate the resulting sequence $(a_1, \ldots, a_n)$ by one position to the right The example of a VHDL fragment for calculating a random permutation containing 19 elements is intended to be used to demonstrate that algorithm 5 can be implemented in a simple and compact manner in hardware:

```
signal rng_enable : std_logic;
signal rng_data : integer range 0 to 15;
signal temp_value : integer range 0 to 18;
type permutation_type is array (0 to 18) of integer range 0 to 18;
signal permutation : permutation_type := (
    0, 1, 2, 3, 4, 5, 6, 7, 8, 9, 10, 11, 12, 13, 14, 15, 16, 17, 18);
signal state : integer range 0 to 3;
signal counter : integer range 0 to 64;
perm_gen : process (clock, reset)
begin - process
    if (reset = '1') then
        state <= 0;
        counter <= 0;
        rng_enable <= '0';
    elsif (rising_edge(clock)) then
        case state is
            when 0 =>
                permutation(0) <= permutation(rng_data);
                temp_value <= permutation(0);
                rng_enable <= '1';
                state <= 1;
            when 1 =>
                permutation(rng_data) <= temp_value;
                rng_enable <= '0';
                state <= 2;
            when 2 =>
                permutation(0 to 18) <= permutation(18) & permutation(0 to 17);
                counter <= counter + 1;
                if (counter = 63) then
                    state <= 3;
                else
                    state <= 0;
                end if;
            when others =>
                assert false report "simulation done" severity failure;
        end case;
    end if;
end process;
```

In order to obtain a functional circuit, the VHDL code is supplemented with an implementation of a random number generator for calculating the signal rng_data. After 64 iterations of the main loop, the deviation, in terms of components, of the probabilities from the uniform distribution is less than 0.001.

In further embodiments, the deterministic cyclical interchange can be applied only to a subset of the sequence elements or may consist of a plurality of cyclical permutations.

In one practical implementation of the method according to the invention in hardware, the cyclical interchange step in algorithms 3 and 4 can be implemented in the form of a shift register operation, for example. The interchange can then be carried out in one clock pulse. The cyclical interchange step is complicated in software because all elements of the representation of the currently calculated permutation must be copied for this purpose. Many memory access operations to the represented permutation are generally required for this purpose. Alternatively, it is possible to rotate the index of the transpositions carried out in each case, which index is permanently selected in these algorithms, and to dispense with the explicit cyclical interchange of all elements. Such an algorithm could operate as follows, for example:

Algorithm 6:
1) For i←1 to l
2) randomly select index j∈{1, . . . , n}
3) interchange the values $a_i$ and $a_j$ in the sequence The example of a VHDL fragment for calculating a random permutation containing 16 elements is intended to be used to demonstrate that algorithm 6 can be implemented in a simple and compact manner in hardware:

```
signal rng_enable : std_logic;
signal rng_data : integer range 0 to 15;
signal read_address, write_address, temp_address : integer range 0 to 15;
signal temp_value : integer range 0 to 15;
type permutation_type is array (0 to 15) of integer range 0 to 15;
signal permutation : permutation_type := (
    0, 1, 2, 3, 4, 5, 6, 7, 8, 9, 10, 11, 12, 13, 14, 15);
signal state : integer range 0 to 3;
signal counter : integer range 0 to 31;
perm_gen : process (clock, reset)
begin -- process
    if (reset = '1') then
        state <= 0;
        counter <= 0;
        temp_address <= 0;
        read_address <= 0;
        rng_enable <= '0';
    elsif (rising_edge(clock)) then
        case state is
            when 0 =>
                temp_value <= permutation(read_address);
                read_address <= rng_data;
                write_address <= temp_address;
                state <= 1;
            when 1 =>
                permutation(write_address) <= permutation(read_address);
                write_address <= rng_data;
                if (temp_address = 15) then
                    temp_address <= 0;
                else
                    temp_address <= temp_address + 1;
                end if;
                rng_enable <= '1';
                state <= 2;
            when 2 =>
                permutation(write_address) <= temp_value;
                read_address <= temp_address;
                rng_enable <= '0';
                counter <= counter + 1;
                if (counter = 30) then
                    state <= 3;
                else
                    state <= 0;
                end if;
            when others =>
                assert false report "simulation done" severity failure;
        end case;
    end if;
end process;
```

In order to obtain a functional circuit, the VHDL code will be supplemented with an implementation of a random number generator for calculating the signal rng_data. After 31 iterations of the main loop, the deviation, in terms of components, of the probabilities from the uniform distribution is less than 0.001.

Since, in order to ward off a first-order Differential Power Analysis (DPA), it is sufficient to uniformly map a fixed original image of the permutation map to all values 1, . . . , n, the probabilities $h_{i,j}$ of the permutation calculated by an approximation algorithm locally mapping i→j are then determined for all pairs 1≤i, j≤n.

The above analysis of the convergence of the algorithms actually produced the stronger result that the calculated permutation as a map converges toward the uniform distribution. The distribution of the values, to which a particular index of the calculated permutation is mapped, is now considered instead. Therefore, smaller values for l result. If resistance to higher-order DPA attacks is intended to be achieved, the distribution of the values of a plurality of indices must accordingly be simultaneously considered.

For a given approximation algorithm, $h_{i,j}^{(l)}$ is used to denote the probability of the permutation calculated by the algorithm after l iterations mapping the position i to j.

In this case, without loss of generality, the algorithm is started with the identity as the starting configuration. This provides the initial probabilities $$h_{i,j}^{(0)} = \delta_{i,j}$$

The following formulas can now be recursively derived: for algorithm 2:

$$h_{i,j}^{(l+1)} = h_{i,j}^{(l)} \cdot \left(1 - \frac{2}{n}\right) + \frac{2}{n^2}$$

This formula results as follows:

$$h_{i,j}^{(l+1)} = \sum_{k=1}^{n} h_{i,k}^{(l)} \cdot p_{k,j},$$

where $p_{k,j}$ is the probability of a transposition which maps the element k to the element j being selected. The following applies $$p_{k,j} = \begin{cases} \frac{2}{n^2} & \text{if } k \neq j \\ \frac{1}{n^2} + \frac{(n-1)^2}{n^2} & \text{else} \end{cases}$$

This results in $$h_{i,j}^{(l+1)} = h_{i,j}^{(l)} \frac{(n-1)^2 - 1}{n^2} + \sum_{k=1}^{n} h_{i,k}^{(l)} \cdot \frac{2}{n^2} = h_{i,j}^{(l)} \frac{n^2 - 2n}{n^2} + \frac{2}{n^2}.$$

The recursion formula for the variant of algorithm 3 without the rotation step is:

$$h_{i,j}^{(l+1)} = \begin{cases} \frac{1}{n} & \text{if } j = 1 \\ h_{i,j}^{(l)} \cdot \left(1 - \frac{1}{n}\right) + h_{i,1}^{(l)} \cdot \frac{1}{n} & \text{else} \end{cases}$$

The probability of the first situation, in which the element i in the last step lands at the position 1, is the probability of the transposition carried out last being (1,k) and of k being the position of the element i after the previous iterations. The second situation is composed of two situations: either the element i is already at the position j≠1 after l steps and the transposition carried out last leaves the position j untouched. In this case, the probability of the transposition leaving the position j untouched is equal to 1−1/n. Or the element i is currently at position 1 and the last step maps the position 1 to j. The probability of this is 1/n.

The recursion formula for algorithm 3 (with rotation) follows from the last formula by simple index shifting:

$$h_{i,j-1}^{(l+1)} = \begin{cases} \frac{1}{n} & \text{if } j = 1 \\ h_{i,j}^{(l)} \cdot \left(1 - \frac{1}{n}\right) + h_{i,1}^{(l)} \cdot \frac{1}{n} & \text{else} \end{cases}$$

where, for j=1, the notation 'j−1' denotes the value n, rather than the value 0.

The following table lists, for the methods according to algorithm 2 and algorithm 3 and for the values n=12 and n=16, the number l of iterations of the main loop needed so that the deviation of all probabilities $h_{i,j}$ from the uniform distribution is at most ε=1/1000:

|  | Algorithm 2 | Algorithms 3, 4 |
| --- | --- | --- |
| n = 12 (without modulo) | 38 | 24 |
| n = 12 (with modulo) | 51 | 33 |
| n = 16 | 52 | 31 |

In this case, the convergence of the recursion formulas for the probabilities can be directly concluded from the results of the above convergence analysis.

Figure 3:
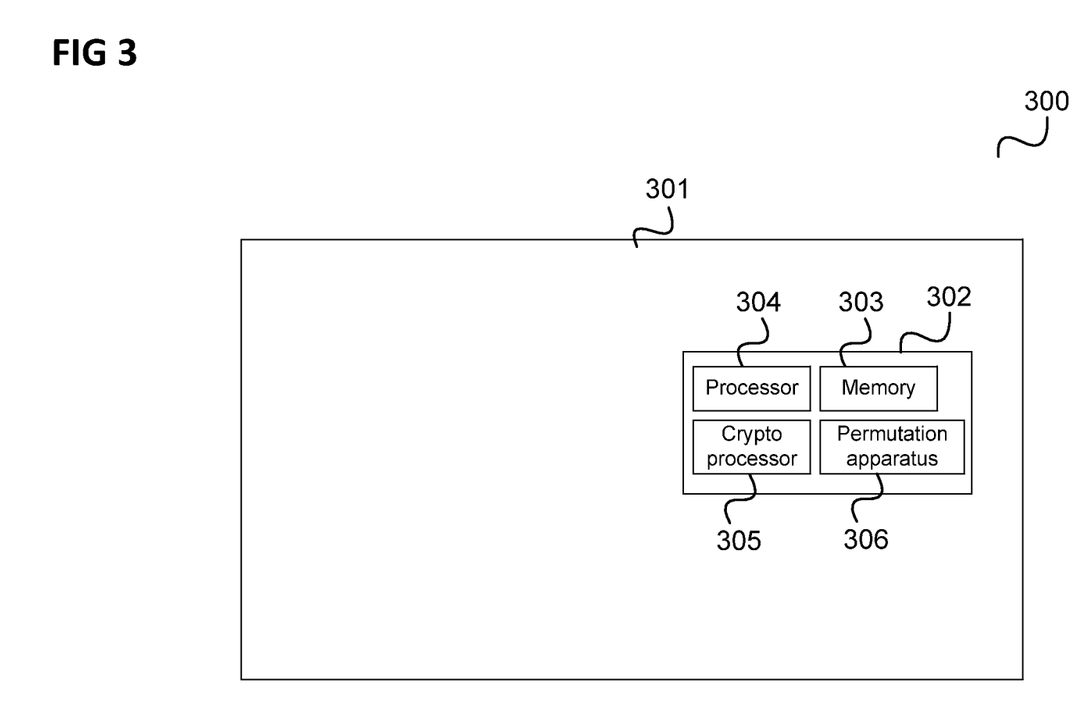
FIG. 3 shows a chip card.

The permutation apparatus 200 is for example arranged on a chip card as illustrated in FIG. 3.

FIG. 3 shows a chip card 300 according to an embodiment.

The chip card 300 includes a carrier 301 on which a chip card module 302 is arranged. The chip card module 302 includes various data processing components like for example a memory 303, a processor 303 or for example a dedicated crypto processor 305.

The chip card module 303 includes a permutation generator 306, e.g. like with reference to FIG. 2 and which for example operates as described above.

For example, the permutation apparatus permutes data elements for, e.g., an operation carried out by the processor 303, e.g. for copying of a memory area of the memory 303 in a random order, for evaluation of the substitution boxes of a symmetrical cipher in a random order or e.g. the permutation of a table containing secret intermediate results of a cryptographic calculation.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for permuting data elements within a chip card module, the method comprising:

receiving a sequence of data elements at an input of a permuting apparatus; and carrying out a plurality of interchange operations within the sequence with a processing device within the permuting apparatus, wherein each interchange operation comprises:

determining a predefined position of a first data element within the sequence received within the permuting apparatus of the chip card module;

randomly determining a second position of a second data element within the sequence;

interchanging the first data element with the second data element; and applying a predefined cyclical permutation to the determined predefined position or to the sequence of data elements.

2. The method of claim 1,
wherein the predefined permutation is a cyclical rotation.

3. The method of claim 1, further comprising:
receiving a random number and randomly selecting the data element from all data elements in the sequence on the basis of the random number.

4. The method of claim 3, further comprising:
receiving the random number from a random number generator.

5. The method of claim 3,
wherein the data element is selected by dividing the random number by the number of data elements with a remainder and selecting the data element as that data element which is indicated by the remainder according to indexing of the data elements.

6. The method of claim 1,
wherein the data element is selected from a subset of the data elements in the sequence.

7. The method of claim 6,
wherein the subset contains a number of data elements which is equal to a power of two.

8. The method of claim 7,
wherein the number is equal to the greatest power of two which is less than or equal to the number of data elements in the sequence.

9. The method of claim 1,
wherein the predefined permutation is applied to the sequence of data elements and the deterministically predefined position is a constant position.

10. The method of claim 1, further comprising:
storing the sequence of data elements in a shift register and cyclically rotating the sequence of data elements using the shift register.

11. The method of claim 1,
wherein a unique iteration index is assigned to each interchange operation of the plurality of interchange operations.

12. The method of claim 1,
wherein, for an interchange operation, the deterministically predefined other data element is deterministically predefined by the iteration index of the interchange operation.

13. The method of claim 1,
wherein, for an interchange operation, the deterministically predefined other data element is that data element which, according to indexing of the data elements, has an index which corresponds to the iteration index of the interchange operation.

14. The method of claim 1, wherein at least one interchange operation occurs based on at least one algorithm.

15. The method of claim 1, wherein at least one interchange operation occurs for each position in the sequence.

16. The method of claim 1, wherein one or more interchange operations of the interchange operation occurs in a one clock pulse.

17. A permuting apparatus configured to be incorporated into a chip card module, wherein the permuting apparatus comprises:

an input which is set up to receive a sequence of data elements;

a shift register set up to store the sequence of data elements;

a processing device set up to carry out a plurality of interchange operations within the sequence, wherein each interchange operation comprises:

determining a predefined position of a first data element within the sequence received within the permuting apparatus;

randomly determining a second position of a second data element within the sequence; and interchanging the first data element with the second data element; and applying a predefined permutation to the determined predefined position or to the sequence of data elements.

* * * * *